United States Patent
Wang

(10) Patent No.: US 9,010,874 B2
(45) Date of Patent: Apr. 21, 2015

(54) WHEEL BEARING DESIGN

(75) Inventor: Zheng Wang, Rochester Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 343 days.

(21) Appl. No.: 13/464,340

(22) Filed: May 4, 2012

(65) Prior Publication Data

US 2012/0292981 A1 Nov. 22, 2012

Related U.S. Application Data

(60) Provisional application No. 61/488,266, filed on May 20, 2011.

(51) Int. Cl.
*B60B 27/00* (2006.01)
*F16C 19/18* (2006.01)
*F16C 19/38* (2006.01)

(52) U.S. Cl.
CPC ............. *F16C 19/186* (2013.01); *F16C 19/386* (2013.01); *F16C 2326/02* (2013.01); *B60B 27/0005* (2013.01); *B60B 2380/75* (2013.01)

(58) Field of Classification Search
USPC ....................................... 301/105.1; 384/544
See application file for complete search history.

(56) References Cited

U.S. PATENT DOCUMENTS

| | | | | | |
|---|---|---|---|---|---|
| 4,359,128 | A | * | 11/1982 | Krude ........................... | 180/258 |
| 4,421,197 | A | * | 12/1983 | Chandioux .................... | 180/258 |
| 4,529,254 | A | * | 7/1985 | Krude ........................... | 301/126 |
| 4,629,028 | A | * | 12/1986 | Krude et al. .................. | 180/259 |
| 5,209,701 | A | * | 5/1993 | Ishikawa et al. ............. | 301/105.1 |
| 5,725,285 | A | * | 3/1998 | Niebling et al. ............. | 301/105.1 |
| 5,757,084 | A | * | 5/1998 | Wagner ....................... | 301/105.1 |
| 5,997,103 | A | * | 12/1999 | Wagner ....................... | 301/105.1 |
| 6,733,396 | B2 | * | 5/2004 | Skvarla et al. ................ | 464/145 |
| 6,935,005 | B2 | * | 8/2005 | Avery et al. ................. | 301/105.1 |
| 7,311,363 | B2 | * | 12/2007 | Suma .......................... | 301/105.1 |
| 7,597,405 | B2 | * | 10/2009 | Langer et al. ............... | 301/105.1 |
| 7,806,597 | B2 | | 10/2010 | Langer et al. | |
| 2001/0019223 | A1 | * | 9/2001 | Kaneko ....................... | 301/105.1 |

* cited by examiner

*Primary Examiner* — Jason Bellinger
(74) *Attorney, Agent, or Firm* — Lucas & Mercanti, LLP

(57) ABSTRACT

A wheel bearing assembly including a modular wheel hub that can be utilized for both passive and driven wheel hub applications with the insertion of a wheel hub bore modification body. The wheel hub is rotatably mounted to a vehicle using a wheel bearing and knuckle arrangement, the wheel bearing comprising an inner ring, outer ring and rolling elements between the rings.

8 Claims, 4 Drawing Sheets

WHEEL BEARING DESIGN

CROSS REFERENCE OF RELATED APPLICATION

This application claims the priority of U.S. 61/488,266 filed May 20, 2011, which is incorporated by reference herein.

TECHNICAL FIELD

The present invention relates to bearing bore designs, particularly of bearings used in wheel applications.

BACKGROUND

Wheel bearing assemblies for vehicle axles are well known in the art. Wheel bearings may take various configurations, from a separate bearing unit that is mounted on a wheel hub assembly, to a partially integrated bearing unit, in which an inner or outer ring (and associated raceways) of the bearing is integrally formed with a wheel hub, to a fully integrated bearing unit that has both inner and outer rings (and associated raceways) integrally formed with a wheel hub and U.S. Pat. No. 7,806,597, for example, discloses a wheel bearing design of the latter type, having a hub with integrally formed raceways on an outer diameter, which is, in turn, rotatably supported by rolling elements and a mounting flange with integrally formed raceways on an inner diameter, mounted to a vehicle.

In addition to various wheel bearing configurations, wheels may be driven or passive. A driven wheel is actively driven by force transmitted from an associated engine. Passive wheels follow the forward/reverse motion provided by the actively driven wheels in a vehicle. Structural variations and design differences may result from the differing functions of a wheel assembly. For example, a driven wheel hub may include a splined inner diameter through which a mating splined drive shaft may be inserted, transferring force through the splines into rotational motion of the associated wheel hub. In turn, a passive wheel hub may include additional structural support through the inner diameter of a hub, as there is no supporting driving member inserted through the assembly, as is the case with a driven assembly.

SUMMARY OF THE INVENTION

A new design for a wheel bearing, in particular, a wheel bearing bore design is disclosed. In one example embodiment of the invention, the assembly comprises a modular wheel hub that can be utilized for both passive and driven wheel hub applications with the insertion of a wheel hub bore modification body. The wheel hub is rotatably mounted to the vehicle using a wheel bearing and knuckle arrangement known in the art, the wheel bearing comprising an inner ring, outer ring and rolling elements between the rings.

A method for assembling a modular wheel hub and hub bore modification body, such as described above, also is provided.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
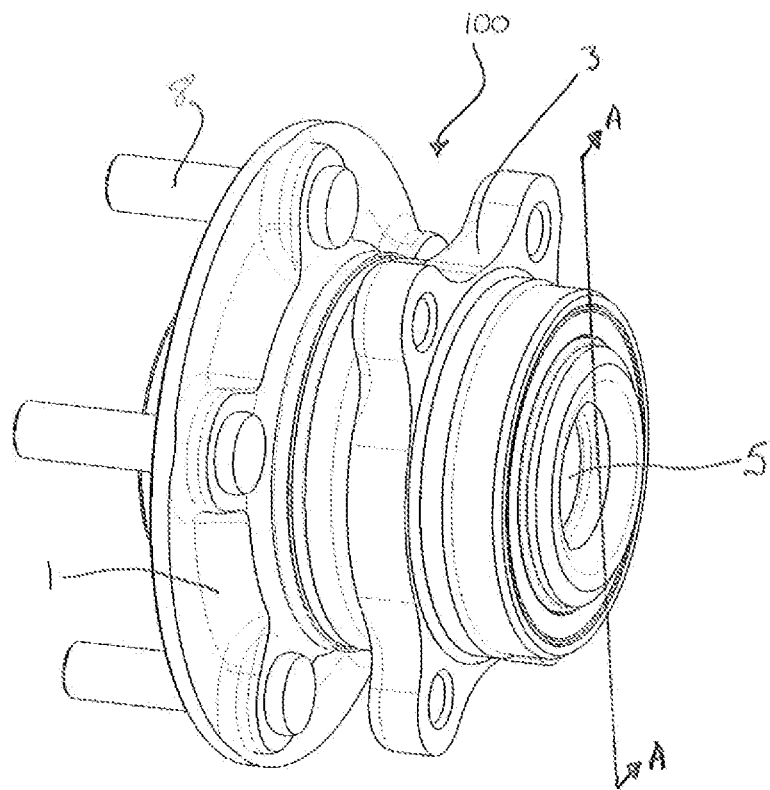
FIG. 1 is a perspective view of the wheel hub assembly according to one example embodiment of the invention.

FIG. 1 shows a perspective view of the wheel hub assembly according to one example embodiment of the invention. Taken from this external view, wheel hub assembly 100 may appear like any known wheel hub assembly, and, therefore, will be used only to provide a complete external perspective of a wheel hub assembly. From this perspective view, wheel hub 1, integrated outer ring 3, bolts 8 and inner diameter 5 are visible.

Figure 2:
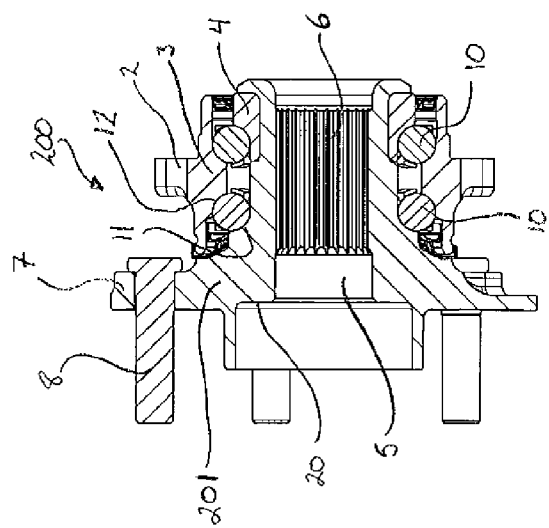
FIG. 2 is a cross sectional view of a prior art driven wheel hub.

FIG. 2 shows a cross sectional view of a prior art driven wheel hub assembly 200. Wheel hub assembly 200 comprises wheel hub 201 rotatably mounted to a vehicle knuckle (not shown) generally by a bolted connection through flange 2 of integrated outer ring 3. Rolling elements 10 are assembled between raceways 11 integrally formed on an outer diameter of hub 201 and inner ring 4, respectively, and raceways 12 integrally formed on an inner diameter of integrated outer ring 3. Hub 201 has a through hole, inner diameter 5, extending from one end of hub 201 to the other, into which may be inserted a drive axle (not shown). Known drive axle assemblies may be assembled into inner diameter 5 of hub 201 by any of several ways, including, but, not limited to, a splined surface on the outer diameter of the drive axle (not shown) mating with a machined spline 6 on a surface of inner diameter 5. A drive shaft (not shown) is then clamped, generally from the wheel end, and generally with the use of a nut (not shown) threaded over an outer surface of the drive shaft, pressing against surface 20 of wheel hub assembly 200. As known in the prior art, a wheel (not shown) may then be assembled to wheel hub assembly 200 using mounting bolts 8 and lug nuts (not shown) inserted through hub flange 7.

Figure 3:
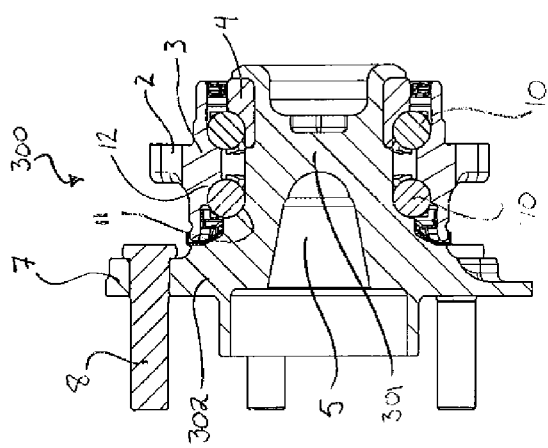
FIG. 3 is a cross sectional view of a prior art passive wheel hub.

FIG. 3 shows a cross sectional view of a prior art passive wheel hub assembly 300. Wheel hub assembly 300 may be assembled and mounted to a vehicle knuckle (not shown) and a wheel (not shown) similarly to wheel hub assembly 200 of FIG. 2. As a passive wheel hub, however, wheel hub assembly 300 requires no driving member. As wheel hub assembly 300 has no driving member inserted through an inner diameter, nor any clamping of the driving member, hub assembly 300 may lose some rigidity in the assembly. As a result, it is known in the prior art to provide a integrally formed support web 301 in an inner diameter 5 of wheel hub 302, to provide rigidity in the assembly.

As may be noted, hub assemblies 200 and 300 of FIGS. 2 and 3, respectively, are substantially similar, with the major difference being the design and structure of inner diameter 5. Although the design of the bearing, rolling elements and related mounting features may vary according to each application's requirements, and are generally known in the prior art, the general need for geometry and a mechanism to support a driving member in a driven wheel application, and the need for a support structure or web to provide rigidity in a passive wheel application may be seen in any variety of different wheel design applications, also known in the art. Therefore, these example are used only for illustrative purposes.

Figure 4:
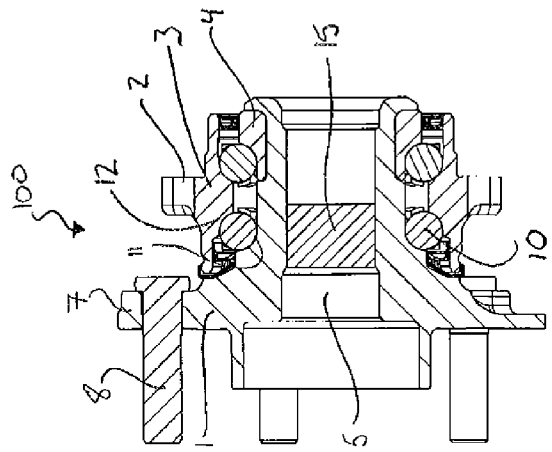
FIG. 4 is a side cross sectional view of the wheel hub, taken along line A-A of FIG. 1.
Figure 6:
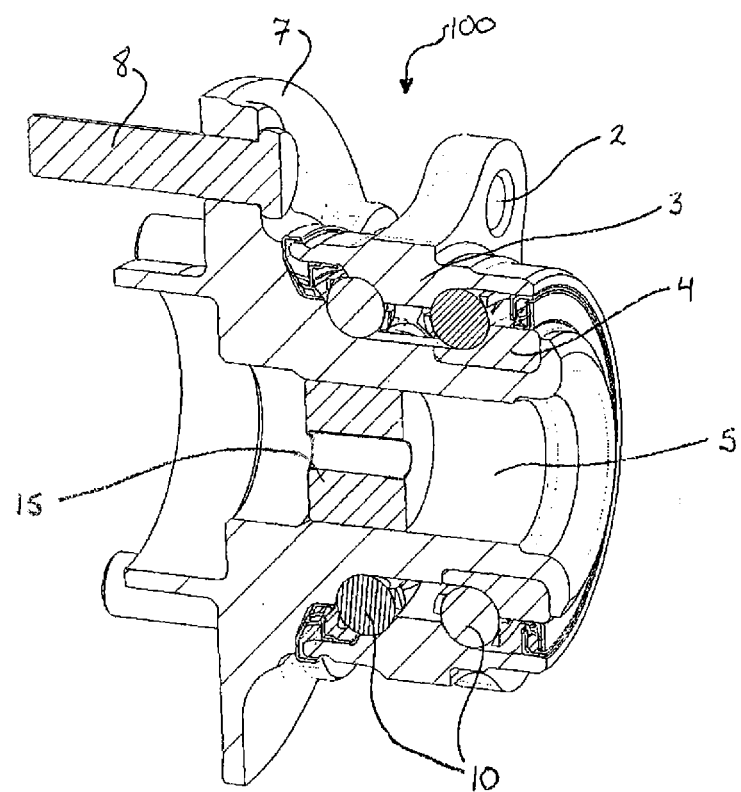
FIG. 6 is a cross sectional perspective view of a wheel hub according to another embodiment of the invention with a hub having a hollow ring shape.

FIG. 4 is a side cross sectional view of wheel hub assembly 100, taken along line A-A of FIG. 1, according to one example embodiment of the invention. For illustrative purposes, integrated outer ring 3, inner ring 4, rolling elements 10 and the general envelope features of the wheel hub assembly are shown as identical to those features in FIGS. 2 and 3, though the invention is not limited to this design configuration. Modular wheel hub 1 has a through bore, inner diameter 5, extending from one end of wheel hub 1 to the other. Where a driven wheel application is required, post machining of inner diameter 5 is often required, including, but not limited to, the machining of splines on a surface of inner diameter 5, similar to that shown in prior art wheel hub assembly 200 of FIG. 2. Alternatively, wheel hub bore modification body 15 may be assembled into inner diameter 5 of modular wheel hub 1. Wheel hub modification body 15 provides additional rigidity to wheel hub assembly 100, particularly when used in a passive wheel design. Modification body 15 is shown as a generally solid cylindrical block, but any number of configurations are possible, including a hollow ring shape (FIG. 6), dumbbell or other rigid contour. FIG. 6 shows only ply the generic shape of a hollow ring shape and does not show any specific dimensions of the hollow ring shape. Body 15 may be assembled into inner diameter 5 by any number of methods, including, but, not limited to press fitting. As shown, modular wheel hub 1 may be used to accommodate both passive and driven wheel design configurations.

Figure 5:
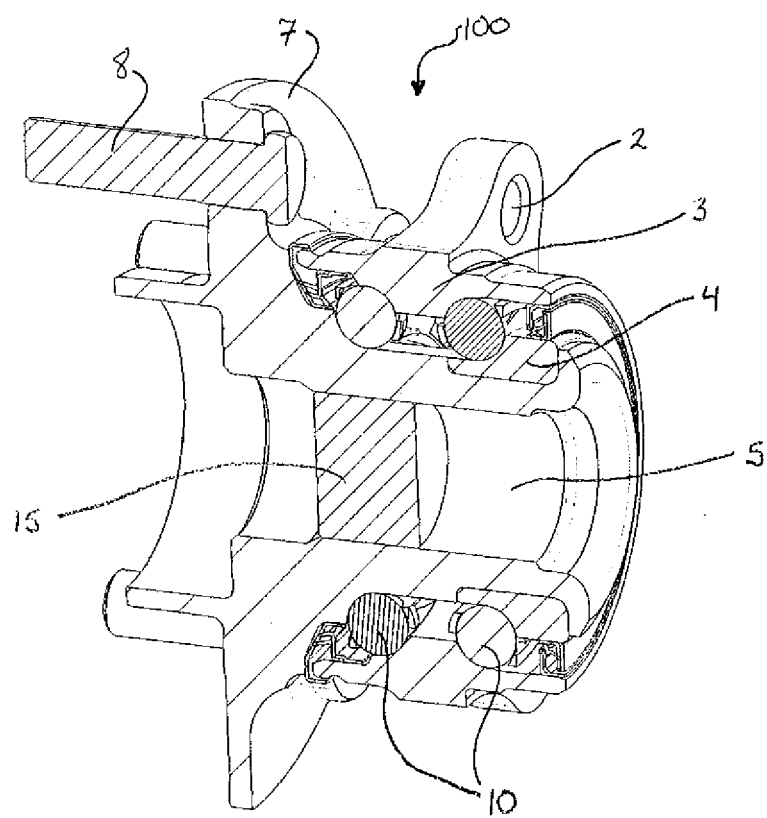
FIG. 5 is a cross sectional perspective view of the wheel hub taken along line A-A of FIG. 1.

FIG. 5 is a cross sectional perspective view of wheel hub assembly 100, taken along line A-A of FIG. 1, showing the same features as described in FIG. 4.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Modular Wheel Hub
2 Integrated Outer Ring Flange
3 Integrated Outer Ring
4 Inner Ring
5 Wheel Hub Inner Diameter or Bore
6 Spline
7 Hub Flange
8 Mounting Bolts
10 Rolling Elements
11 Raceway
12 Raceway
15 Wheel Hub Bore Modification Body
20 Clamping Surface
100 Wheel Hub Assembly
200 Wheel Hub Assembly
201 Wheel Hub
300 Wheel Hub Assembly
301 Integrally Formed Support Web
302 Wheel Hub

What I claim is:

1. A wheel bearing arrangement comprising:
a wheel hub with an inner bore extending through said wheel hub from one axial end to an opposite end;
two rows of rolling elements for mounting the wheel hub;
said wheel hub rotatably supported by said rolling elements;
an outer ring and outer race, and an inner ring and inner race, said rolling elements being disposed between the outer race and the inner race;
a bore modification body assembled into said inner bore and providing additional rigidity to the wheel hub, whereby the wheel hub is usable as a passive wheel when the at least one bore modification body is assembled therein, and the wheel hub is usable as a driven wheel without the at least one bore modification body assembled therein.

2. The wheel bearing of claim 1, wherein, said inner diameter of said wheel hub is modifiable to accommodate assembly of a drive member extending at least partially through said inner bore.

3. The wheel bearing of claim 2, wherein, said inner bore is modifiable to include machining splines in a surface of said inner bore.

4. The wheel bearing of claim 1, wherein, said bore modification body includes a solid cylindrical body, press fit into a diameter of said inner bore.

5. The wheel bearing of claim 1, wherein, said bore modification body includes a hollow ring cylindrical body, press fit into a diameter of said inner bore.

6. A wheel bearing bore modification body comprising:
a rigidly formed substantially cylindrical body inserted into an inner bore of a wheel hub, the body providing additional rigidity to the wheel hub, whereby the wheel hub is usable as a passive wheel when the bore modification body is assembled therein, and the wheel hub is usable as a driven wheel without the bore modification body assembled therein.

7. A wheel bearing bore modification body of claim 6, wherein, said bore modification body includes a solid cylindrical body, press fit into a diameter of said inner bore.

8. A wheel bearing bore modification body of claim 6, wherein, said bore modification body includes a hollow ring cylindrical body, press fit into a diameter of said inner bore.

* * * * *